United States Patent [19]
Bonnet

[11] Patent Number: 5,441,141
[45] Date of Patent: * Aug. 15, 1995

[54] AUTOMATIC ROTARY SORTER AND CYLINDRICAL STORAGE SYSTEM

[75] Inventor: Henri Bonnet, Atlanta, Ga.

[73] Assignee: United Parcel Service of America, Inc., Atlanta, Ga.

[ * ] Notice: The portion of the term of this patent subsequent to Feb. 8, 2011 has been disclaimed.

[21] Appl. No.: 121,147

[22] Filed: Sep. 13, 1993

Related U.S. Application Data

[63] Continuation-in-part of Ser. No. 792,211, Nov. 13, 1991, Pat. No. 5,284,252.

[51] Int. Cl.⁶ ............................................. B65G 47/00
[52] U.S. Cl. ................... 198/370.03; 198/786; 414/278
[58] Field of Search ............... 209/586, 583, 584, 552, 209/606; 198/369, 463.3, 786, 372, 365; 414/278, 787, 283, 266–269; 271/298, 300, 302, 295

[56] References Cited

U.S. PATENT DOCUMENTS

| | | |
|---|---|---|
| 1,741,616 | 12/1929 | Crady . |
| 1,753,036 | 4/1930 | Williamson . |
| 1,903,102 | 3/1933 | Farley . |
| 2,711,817 | 6/1966 | Hautau . |
| 3,059,794 | 10/1962 | Lindemann . |
| 3,302,804 | 2/1967 | Harris ...................... 414/283 |
| 3,403,799 | 10/1968 | Sindzinski . |
| 3,530,571 | 9/1970 | Perry . |
| 3,639,728 | 2/1972 | Helfand . |
| 3,750,804 | 8/1973 | Lemelson .................. 414/283 |
| 4,027,767 | 7/1977 | Gluck . |
| 4,044,897 | 8/1977 | Maxted . |
| 4,047,625 | 9/1977 | Grant . |
| 4,103,787 | 8/1978 | Salloum .................... 414/278 |
| 4,132,313 | 1/1979 | Kolosov .................... 271/298 |
| 4,191,368 | 3/1980 | Brookhyser ................ 271/296 |
| 4,291,797 | 9/1981 | Ewertowski ............... 198/365 |
| 4,326,624 | 4/1982 | Ewertowski . |
| 4,776,464 | 10/1988 | Miller . |
| 4,797,055 | 1/1989 | Tworoger et al. .......... 414/283 |
| 4,867,299 | 9/1989 | Fukuroka . |
| 5,090,552 | 2/1992 | Fukuyama et al. ......... 198/365 |
| 5,113,993 | 5/1992 | Okada . |
| 5,284,252 | 2/1994 | Bonnet ...................... 209/552 |

FOREIGN PATENT DOCUMENTS

| | | |
|---|---|---|
| 942686 | 2/1974 | Canada . |
| 3539723 | 5/1987 | Germany . |
| 0016274 | 2/1978 | Japan ........................ 414/267 |
| 0140782 | 12/1978 | Japan ........................ 414/278 |
| 0105825 | 5/1987 | Japan ........................ 414/278 |

Primary Examiner—H. Grant Skaggs
Attorney, Agent, or Firm—R. Anthony Diehl; William H. Murray

[57] ABSTRACT

A system for sorting objects having a source for providing the object for sorting and a plurality of receivers, spaced apart horizontally and vertically, for receiving the object after sorting. The system includes object receiving and discharging wings for receiving the object from the source and transferring the object to the receiver. The object receiving and discharging wings move the object horizontally and vertically from the source to a selected receiver. The source and at least one of the receivers are vertically aligned. Also, a system for storing and retrieving objects having storage and retrieval conveyor for providing the object to the system for storage and for retrieving the object from the system after storage, and a plurality of object storage areas spaced apart horizontally and vertically. The system includes object receiving and discharging wings for receiving the object from the storage and retrieval conveyor and transferring the object to the storage area and for receiving the object from the storage area and transferring the object to the storage and retrieval conveyor. The object receiving and discharging wings have move the object horizontally and vertically from the storage and retrieval conveyor to a selected storage area. The object receiving and discharging wings further have move the object horizontally and vertically from the selected object storage area to the storage and retrieval conveyor.

54 Claims, 7 Drawing Sheets

AUTOMATIC ROTARY SORTER AND CYLINDRICAL STORAGE SYSTEM

CROSS-REFERENCE TO RELATED APPLICATION

The present application is a continuation-in-part of U.S. patent application Ser. No. 07/792,211, filed Nov. 13, 1991, and now U.S. Pat. No. 5,284,252, the contents of which are incorporated herein in their entirety by reference.

BACKGROUND OF THE INVENTION

1. Field of the Invention

The present invention relates to the sorting, storage and retrieval of objects, and in particular, to the sorting of objects from a single source stream into a plurality of destination streams, and the storage and retrieval of objects between a single storage and retrieval stream and a plurality of storage locations.

2. Statement of Related Art

In the field of package shipping, packages are received from many areas of the country, or even the world, for distribution to a variety of other areas. Packages arrive at distribution centers in groups sharing common sources and leave in groups sharing common destinations. Thus, shipments of common-source packages must be efficiently sorted into shipments of common-destination packages.

Affixed to each package is a shipping label containing, along with other information, the zip code of the package destination. The zip codes of the possible package destinations are organized into twelve different categories, with each zip code falling in only one category.

In many known sorting systems, a shipment of packages arrives at a distribution center, usually by truck. The packages are unloaded from the truck onto a feed conveyor which transports the packages to a worker who sorts them. In prior art sorting systems, this sorter reads the zip code of the destination address of each package as it arrives at the end of the feed conveyor. The sorter determines the appropriate zip code category corresponding to the zip code of each package.

Adjacent to the sorter is an array of twelve receiving conveyors, arranged in three different levels of four receiving conveyors each. Each receiving conveyor corresponds to one of the twelve zip code categories. The sorter must pick up the package from the end of the feed conveyor, turn toward the array of receiving conveyors, and place the package onto the correct receiving conveyor.

Each package is then advanced along its appropriate receiving conveyor. A package may then be loaded for further shipment or may continue through one or more similar sorting operations before being loaded for further shipment. A distribution center may also have multiple shipment acceptance points. As a result, as many as 20 or 60 sorters may be operating simultaneously in a distribution center.

There are many problems with these prior art systems. For example, complicated training of employees must be provided to enable them to perform the sorting operations. Furthermore, different sorting stations may have different categories of zip codes. Therefore a sorter must know the system of categorization of zip codes for an individual sorting station. As a result, a sorter must be familiar with virtually all the addresses in the country in order to be able to operate at different sorting stations.

To operate effectively, a sorter must be able to recognize and select the correct receiving conveyor with about 99.9 percent effectiveness. This limits the pool of potential laborers who are able to qualify as sorters. Additionally, the package shipping business is growing faster than the supply of potential laborers who can perform the physically and mentally demanding tasks of the sorter.

Furthermore, very difficult physical demands are imposed upon a sorter. A typical sorter may sort approximately 1000 packages an hour over an approximately three and a half hour shift. A typical sorter's physical capabilities limit package weight to about 70 pounds and package size to about 5 feet in any dimension. The number and arrangement of receiving conveyors is also limited by the physical size of the sorters. A typical sorter is only able to place packages safely and securely on receiving conveyors that are no more than about five feet above ground level.

The timing of the work shifts of the sorters throughout the day further reduces the size of the available labor pool. Sorting activity consists of four shifts distributed roughly evenly through the day and night. Thus, the three-and-a-half hour shifts are separated by roughly two and a half hours, during which sorting activity is not required.

Furthermore, sorters make errors. They may place packages on the wrong receiving conveyors. They may drop or otherwise damage packages. Additionally, they are subject to injury when sorting packages.

The prior art teaches automatic sorters that are adapted to sort objects. U.S. Pat. No. 4,867,299, issued to Fukuoka et al. on Sep. 19, 1989, teaches a distributor for distributing veneer sheets wherein a single source stream of veneer sheets is divided into two vertically arranged destination streams of veneer sheets. This distributor solves some of the physical limitations inherent in the use of humans in known package sorting systems. For example, the distributor of Fukuoka et al. can work continuously for longer periods of time than a human. Furthermore, it is able to distribute larger and heavier packages than a single human can handle safely. In addition, such an apparatus has the advantage of being able to receive one package from the feed conveyor at the same time that it is depositing another package onto one of the receiving conveyors.

However, the distributor taught by Fukuoka et al. does not solve all the problems associated with known package sorting systems. Foremost is that distribution by such a distributor is not sorting. For example, package sorting involves the selective distribution of packages according to their zip codes. The distribution performed by the distributor taught by Fukuoka et al. is simple alternation between the upper and lower destination streams. This distributor distributes every other object to the upper destination stream and the rest of the objects to the lower destination stream, without any regard to differences between the objects distributed. Such a distributor cannot sort packages according to their desired destinations in the field of package shipping.

Another problem with the distributor taught by Fukuoka et al. is that it is limited to two destination streams. Known package sorting systems require a sorter to be able to sort a single source stream of packages into at least twelve destination streams. Although the distributor taught by Fukuoka et al. could distribute to twelve destination streams, stacking twelve receiving conveyors would require an excessive amount of vertical space and an excessive amount of travel to place the objects on a selected receiving conveyor. Furthermore, the distributor taught by Fukuoka et al. could not distribute packages to the twelve receiving conveyors in known package sorting systems, since those receiving conveyors are arranged in arrays of rows and columns of receiving conveyors.

U.S. Pat. No. 4,326,624, issued to Ewertowski et al. on Apr. 27, 1982, teaches a pallet changer which may be applied to known package sorting systems. The pallet changer taught by Ewertowski et al. sorts pallets from a single source stream of pallets into a plurality of destination locations arranged in a circle about the pallet changer. The pallet changer distributes one pallet at a time from the single source stream to a selected destination. The destination is selected according to characteristics of the particular pallet being sorted.

However, the pallet changer taught by Ewertowski et al. does not solve all the problems associated with known package sorting systems. A sorting system such as the pallet changer taught by Ewertowski et al. that contained twelve receiving conveyors arranged in a circle about the pallet changer would require an excessive amount of horizontal space. Furthermore, the distributor taught by Ewertowski et al. could not distribute packages to the known package sorting systems having twelve receiving conveyors arranged in arrays of rows and columns.

Thus, the prior art does not teach a mechanical sorter capable of solving the problems of known package sorting systems which require distribution to an array of receiving conveyors.

SUMMARY OF THE INVENTION

In the automatic rotary sorter system of the present invention, packages are unloaded, for example, from a truck onto a feed conveyor. The feed conveyor advances the packages one by one onto an induction conveyor disposed at the end of the feed conveyor. The induction conveyor is a tapered assembly of live lagged rollers. While the feed conveyor may hold many packages at once, at most one package at a time rests on the induction conveyor.

The automatic rotary sorter of the present invention is provided with an upright drive shaft to which four horizontal receiving and discharging wings are slidably coupled. Each receiving and discharging wing is a tapered conveyor assembly of reversible live lagged rollers. Reversible live rollers are provided on the receiving and discharging wings in order to permit both on-loading of packages from the induction conveyor onto the receiving and discharging wing and off-loading of packages from the receiving and discharging wing onto a selected receiving conveyor. In the present invention, at least one receiving conveyor is positioned substantially overhead of the induction conveyor.

In addition to rotational movement, each of the receiving and discharging wings may move vertically along a respective vertical guide rail on the upright drive shaft. Each receiving and discharging wing travels vertically independent of the other receiving and discharging wings. As each receiving and discharging wing rotates past the induction conveyor, the vertical position of the receiving and discharging wing may be matched to the vertical position of the induction conveyor. When a receiving and discharging wing is at the correct position, both vertically and angularly, relative to the induction conveyor, the live rollers of the induction conveyor and the live rollers of the receiving and discharging wing act cooperatively to transfer the package from the induction conveyor onto the receiving and discharging wing.

When the trailing edge of the now-laden receiving and discharging wing clears the induction conveyor, the receiving and discharging wing may move along its vertical guide rail. As the receiving and discharging wing continues to rotate about the central vertical axis, the level of the loaded receiving and discharging wing is matched to the level of the selected receiving conveyor. The receiving conveyor selected may be positioned substantially overhead of the induction conveyor.

When the receiving and discharging wing is at the correct vertical and angular position relative to the selected receiving conveyor, the live rollers of the receiving and discharging wing and the selected receiving conveyor are activated to transfer the package from the receiving and discharging wing onto the selected receiving conveyor. The package then proceeds along the selected receiving conveyor for shipping or further sorting.

When the trailing edge of the now-unloaded receiving and discharging wing clears the selected receiving conveyor, the receiving and discharging wing may again move along its vertical guide rail. As the receiving and discharging wing continues to rotate about the central vertical axis, the level of the receiving and discharging wing is matched to that of the induction conveyor in time to receive another package.

In the automatic cylindrical storage system of the present invention, an upright drive shaft is provided to which four horizontal receiving and discharging wings are slidably coupled. Each receiving and discharging wing is a tapered conveyor assembly of reversible live lagged rollers. In a storage mode, reversible live rollers are provided on the receiving and discharging wings in order to permit both on-loading of packages from a storage and retrieval conveyor onto the receiving and discharging wing and off-loading of packages from the receiving and discharging wing onto a selected storage rack. In a retrieval mode, reversible live rollers are provided on the receiving and discharging wing in order to permit both off-loading of packages from the receiving and discharging wing onto the storage and retrieval conveyor and on-loading of packages from a selected storage rack onto the receiving and discharging wing.

In addition to rotational movement, each of the receiving and discharging wings may move vertically along a respective vertical guide rail on the upright drive shaft. Each receiving and discharging wing travels vertically independent of the other receiving and discharging wings. As each receiving and discharging wing rotates past the storage and retrieval conveyor, the vertical position of the receiving and discharging wing may be matched to the vertical position of the storage and retrieval conveyor. When a receiving and discharging wing is at the correct position, both vertically and angularly, relative to the storage and retrieval conveyor, the live rollers of the storage and retrieval conveyor and the live rollers of the receiving and discharging wing act cooperatively to transfer a package from storage and retrieval conveyor onto the receiving and discharging wing or from the receiving and discharging wing onto the storage and retrieval conveyor.

When the trailing edge of the receiving and discharging wing clears the storage and retrieval conveyor, the receiving and discharging wing may move along its vertical guide rail. As the receiving and discharging wing continues to rotate about the central vertical axis, the level of the receiving and discharging wing may be matched to the level of a selected storage rack. When the receiving and discharging wing is at the correct vertical and angular position relative to the selected storage rack, the live rollers of the receiving and discharging wing and the selected storage rack may be activated to transfer a package from the receiving and discharging wing onto the selected storage rack or from the selected storage rack onto the receiving and discharging wing.

BRIEF DESCRIPTION OF THE DRAWINGS

While the specification concludes with claims particularly pointing out and distinctly claiming the subject matter which is regarded as the invention, it is believed that the invention and advantages thereof will be better understood from the following description taken in connection with the accompanying drawings in which:

DETAILED DESCRIPTION OF THE INVENTION

Figure 1:
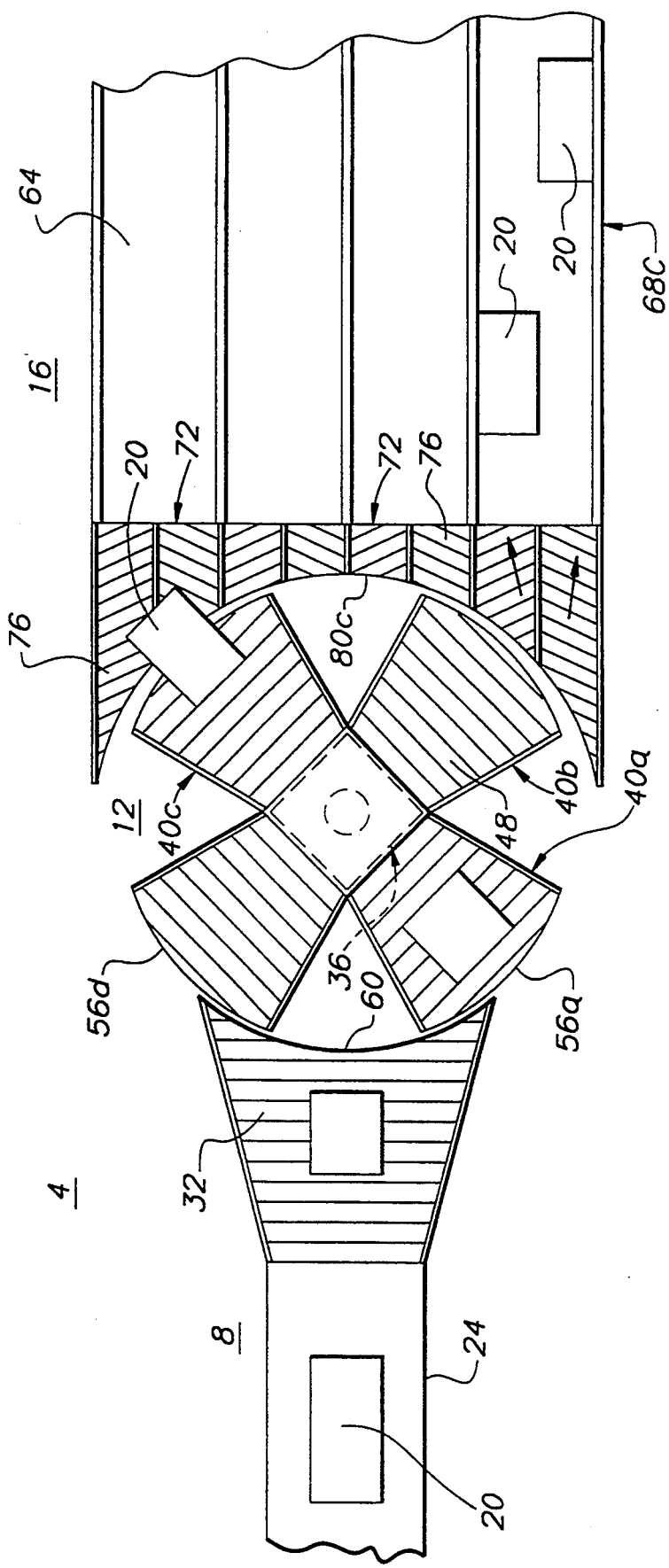
FIG. 1 is a plan view of the preferred embodiment of the automatic rotary sorter system of the present invention.
Figure 2:
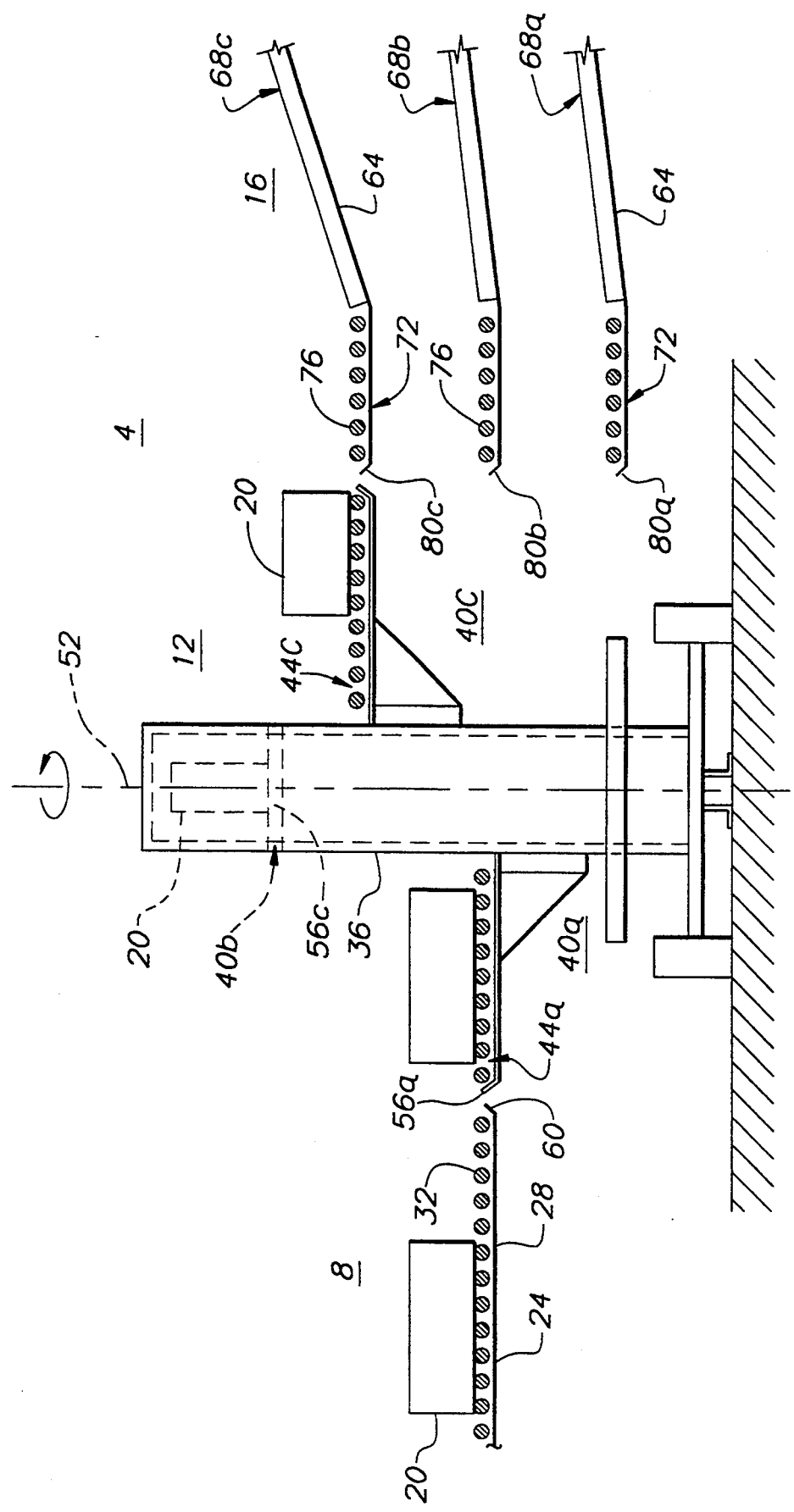
FIG. 2 is a side view of the automatic rotary sorter system of FIG. 1.

Referring now to FIGS. 1, 2, there are shown, respectively, plan and side views of the preferred embodiment of automatic rotary sorter system 4 of the present invention. Automatic rotary sorter system 4 includes object source conveyor 8, rotating distribution assembly 12, and object receiving assembly 16. Rotating distribution assembly 12 of automatic rotary sorter system 4 is provided with upright drive shaft 36 and four receiving and discharging wings 40a–d. Object receiving assembly 16 of automatic rotary sorter system 4 is provided with a plurality of transverse conveyors 64. Object source conveyor 8 provides a stream of sortable objects 20 for sorting by automatic rotary sorter system 4. Sorting within automatic rotary sorter system 4 is achieved through the transfer of one sortable object 20 at a time from object source conveyor 8 to a selected transverse conveyor 64 by receiving and discharging wings 40a–d of rotating distribution assembly 12. Sortable objects 20 are then advanced along selected transverse conveyor 64 for removal from automatic rotary sorter system 4.

In the preferred embodiment of automatic rotary sorter system 4, rotating distribution assembly 12, for transferring sortable objects 20 from object source conveyor 8 to a selected transverse conveyor 64, consists of rotatably mounted upright drive shaft 36 to which four receiving and discharging wings 40a–d are slidably coupled. Each slidably coupled receiving and discharging wing 40a–d of rotating distribution assembly 12 is adapted to: (a) receive sortable objects 20 from object source conveyor 8, (b) retain sortable objects 20 during rotation of rotating distribution assembly 12, and (c) discharge sortable objects 20 onto a selected transverse conveyor 64 of object receiving assembly 16.

Upright drive shaft 36 of rotating distribution assembly 12 is aligned along and rotates about vertical axis of rotation 52. As upright drive shaft 36 rotates about vertical axis of rotation 52, receiving and discharging wings 40a–d of rotating distribution assembly 12, coupled to upright drive shaft 36, also rotate about vertical axis of rotation 52. In addition to rotating about vertical axis of rotation 52 along with upright drive shaft 36, each receiving and discharging wing 40a–d may move up and down along upright drive shaft 36 independently of all other receiving and discharging wings 40a–d. Additionally, all receiving and discharging wings 40a–d of rotating distribution assembly 12 may move up and down along upright drive shaft 36 simultaneously.

As each receiving and discharging wing 40a–d of rotating distribution assembly 12 rotates past object source conveyor 8, the vertical position of receiving and discharging wing 40a–d along upright drive shaft 36 is matched to the vertical level of object source conveyor 8. When receiving and discharging wing 40a–d of rotating distribution assembly 12 passes object source conveyor 8, at most one sortable object 20 is transferred from object source conveyor 8 to receiving and discharging wing 40a–d.

In the preferred embodiment of automatic rotary sorter system 4, object receiving assembly 16 of automatic rotary sorter system 4 includes twelve transverse conveyors 64 spaced apart in three horizontal levels 68a–c of four transverse conveyors 64 each. Horizontal levels 68a–c of object receiving assembly 16 are disposed vertically one above the other. Thus, each transverse conveyor 64 of object receiving assembly 16 is uniquely designated by (i) a vertical level of displacement along upright drive shaft 36 parallel to vertical axis of rotation 52, and (ii) an angular orientation of upright drive shaft 36 about vertical axis of rotation 52 relative to, for example, object source conveyor 8.

When sortable object 20 is loaded onto receiving and discharging wing 40a–d of rotating distribution assembly 12, the vertical position of receiving and discharging wing 40a–d along upright drive shaft 36 is matched to the vertical level of a selected transverse conveyor 64 of object receiving assembly 16 to which sortable object 20 is to be transferred while upright drive shaft 36 is rotating. When receiving and discharging wing 40a–d of rotating distribution assembly 12 rotates past selected transverse conveyor 64, sortable object 20 on receiving and discharging wing 40a–d is transferred from receiving and discharging wing 40a–d to selected transverse conveyor 64. Once sortable object 20 is transferred to selected transverse conveyor 64, the vertical position of receiving and discharging wing 40a–d along upright drive shaft 36 may then be matched to the vertical level of object source conveyor 8 for receiving and sorting of another sortable object 20.

All four receiving and discharging wings 40a-d of rotating distribution assembly 12 may operate simultaneously and independently of each other within automatic rotary sorting system 4. Thus, sortable objects 20 may be sorted by automatic rotary sorter system 4 at a maximum rate of four sortable objects 20 for each rotation of rotating distribution assembly 12. Automatic rotary sorting system 4 of the present invention may sort two thousand or more objects an hour.

Automatic rotary sorter system 4 includes object source conveyor 8, rotating distribution assembly 12, and object receiving assembly 16. Rotating distribution assembly 12 of automatic rotary sorter system 4 is provided with upright drive shaft 36 and at least one receiving and discharging wing 40a-d. Object receiving assembly 16 of automatic rotary sorter system 4 is provided with a plurality of transverse conveyors 64. Object source conveyor 8 provides a stream of sortable objects 20 wherein each sortable object 20 is directed to a selected transverse conveyor 64 within object receiving assembly 16 by rotating distribution assembly 12. Sorting within automatic rotary sorter system 4 is thus achieved through the transfer of one sortable object 20 at a time from object source conveyor 8 to selected transverse conveyor 64 by rotating distribution assembly 12. Sortable objects 20 are then advanced along selected transverse conveyor 64 for removal from automatic rotary sorter system 4.

Object source conveyor 8 of automatic rotary sorter system 4 includes feed conveyor 24 and induction conveyor 28. Sortable objects 20 are advanced along feed conveyor 24 toward induction conveyor 28, transferred one at a time onto induction conveyor 28, and then transferred one at a time onto a receiving and discharging wing 40a-d of rotating distribution assembly 12. Lagged live rollers 32 of induction conveyor 28 provide the impetus for moving sortable object 20 along induction conveyor 28 and for discharging sortable object 20 onto receiving and discharging wings 40a-d.

Induction conveyor 28 is formed to have increasing horizontal width in the direction toward receiving and discharging wings 40a-d. This tapering provides increased dwell time during which transfer of sortable objects 20 from object source conveyor 8 to rotating distribution assembly 12 may occur. The lengths of rollers 32 of induction conveyor 28 are therefore selected according to this tapering of induction conveyor 28. Thus, rollers 32 increase in length in the direction toward receiving and discharging wings 40a-d.

Rotating distribution assembly 12 of automatic rotary sorter system 4, for transferring sortable objects 20 from object source conveyor 8 to a selected transverse conveyor 64, includes rotatably mounted upright drive shaft 36 to which four receiving and discharging wings 40a-d are coupled. Each receiving and discharging wing 40a-d of rotating distribution assembly 12 is adapted to: (a) receive sortable objects 20 from object source conveyor 8, (b) retain sortable objects 20 during rotation of rotating distribution assembly 12, and (c) discharge sortable objects 20 onto object receiving assembly 16. Each receiving and discharging wing 40a-d of rotating distribution assembly 12 is provided with horizontally aligned, tapered, reversible conveyor 44a-d having lagged live rollers 48. The tapering, with an increasing width of receiving and discharging wings 40a-d in the radially outward direction from upright drive shaft 36, further increases the dwell time for transfer of sortable objects 20 from object source conveyor 8 to receiving and discharging wings 40a-d. Lagged live rollers 48 of receiving and discharging wings 40a-d are used for receiving sortable object 20 from induction conveyor 28 of object source conveyor 8 and for discharging sortable object 20 to transverse conveyors 64 of object receiving assembly 16. Corresponding to the tapering of receiving and discharging wings 40a-d, lagged live rollers 48 increase in length in the radially outward direction from upright drive shaft 36.

Upright drive shaft 36 is aligned along and rotates about vertical axis of rotation 52. As upright drive shaft 36 rotates about vertical axis of rotation 52, receiving and discharging wings 40a-d, coupled to upright drive shaft 36, also rotate about vertical axis of rotation 52. This rotational motion of upright drive shaft 36 and receiving and discharging wings 40a-d defines a first degree of freedom of motion of rotating distribution assembly 12.

It will be understood that a structure having linear translation and rotation about an axis has two different degrees of freedom. Motion in the linear degree of freedom provides access to locations in one dimension. These locations are disposed along a line. Similarly, motion in the rotational degree of freedom provides access to locations along an arc. Motion in these two degrees of freedom, where one degree of freedom is rotational about an axis of rotation and the other degree of freedom is linear and parallel to that axis of rotation, provides access to locations on the surface of a cylinder.

It will be understood that the rotational motion of upright drive shaft 36 and receiving and discharging wings 40a-d of rotating distribution assembly 12 about vertical axis of rotation 52 is motion in the rotational degree of freedom. It will also be understood that the independent and simultaneous motion of receiving and discharging wings 40a-d along upright drive shaft 36 is motion in the linear degree of freedom and defines a second degree of freedom of motion of rotating distribution assembly 12. Thus, considering both (a) the rotational motion of upright drive shaft 36 and receiving and discharging wings 40a-d about vertical axis of rotation 52, and (b) the motion of receiving and discharging wings 40a-d along upright drive shaft 36, rotating distribution assembly 12 is capable of motion in two degrees of freedom. This two-degree-of-freedom combination of linear and rotational motion allows receiving and discharging wings 40a-d to access locations distributed cylindrically about vertical axis of rotation 52.

As each receiving and discharging wing 40a-d of rotating distribution assembly 12 rotates past induction conveyor 28 of object source conveyor 8, the vertical position of receiving and discharging end 56a-d of receiving and discharging wing 40a-d along upright drive shaft 36 is matched to the vertical level of discharging end 60 of induction conveyor 28. Discharging end 60 of induction conveyor 28 is shaped to conform with the shape of receiving and discharging ends 56a-d of respective receiving and discharging wings 40a-d of rotating distribution assembly 12, to transfer sortable objects 20 from induction conveyor 28 to receiving and discharging wing 40a-d.

In the preferred embodiment of automatic rotary sorter system 4, when receiving and discharging wing 40a-d of rotating distribution assembly 12 passes induction conveyor 28 of object source conveyor 8, at most one sortable object 20 is transferred from induction conveyor 28 to receiving and discharging wings 40a-d. This transfer of sortable object 20 from induction conveyor 28 to receiving and discharging wing 40a–d of rotating distribution assembly 12 is accomplished by the action of lagged live rollers 32 of induction conveyor 28 to move sortable object 20 from conveyor 28 and lagged live rollers 48 of receiving and discharging wings 40a–d to move sortable object 20 onto vanes 40a–d.

Each transverse conveyor 64 of object receiving assembly 16 is provided with its individual acquisition conveyor 72. Each acquisition conveyor 72 of transverse conveyors 64 contains lagged live rollers 76. Lagged live rollers 76 are used for receiving sortable object 20 from receiving and discharging wings 40a–d.

When sortable object 20 is loaded onto receiving and discharging wing 40a–d of rotating distribution assembly 12, the vertical position of receiving and discharging wing 40a–d along upright drive shaft 36 is matched to the vertical level of a selected acquisition conveyor 72 of transverse conveyor 64 to which sortable object 20 is to be transferred. When receiving and discharging wing 40a–d of rotating distribution assembly 12 rotates past receiving end 80a–c of selected acquisition conveyor 72, sortable object 20 on receiving and discharging wing 40a–d is transferred from receiving and discharging wing 40a–d to selected acquisition conveyor 72. This transfer may be performed by both live rollers 48 of receiving and discharging wings 40a–d and live rollers 76 of acquisition conveyors 72.

Receiving ends 80a–c of acquisition conveyors 72 are shaped to conform with the shape of receiving and discharging end 56a–d of receiving and discharging wing 40a–d in order to transfer sortable objects 20 from receiving and discharging wing 40a–d to acquisition conveyors 72 of transverse conveyor 64. This conformity of shape between receiving ends 80a–c of acquisition conveyors 72 and receiving and discharging end 56a–d of receiving and discharging wing 40a–d increases the dwell time during which transfer of sortable objects may occur. In order to achieve conformance of shape, the shapes of receiving ends 80a–c of acquisition conveyors 72 vary depending upon the orientation of each acquisition conveyor 72 to the rotational path of receiving and discharging wing 40a–d. This conformance of shape is provided by the circular curvature of receiving ends 80a–c. The lengths of live rollers 76 of acquisition conveyors 72 vary as the width of acquisition conveyors 72 varies to achieve this conformance of shape. The length of wings 40a–d is adapted to cause receiving and discharging ends 56a–d to pass substantially close to receiving ends 80a–c in order to permit sortable object 20 to pass easily onto acquisition conveyors 72.

As described above, the two degrees of freedom of motion of rotating distribution assembly 12 provide access by receiving and discharging wings 40a–d of rotating distribution assembly 12 to locations distributed cylindrically about vertical axis of rotation 52. Thus, the shapes of receiving ends 80a–c of acquisition conveyors 72 of object receiving assembly 16 are selected to conform to the cylindrically defined range of motion of receiving and discharging wings 40a–d.

The transfer of sortable objects 20 from receiving and discharging wings 40a–d of rotating distribution assembly 12 to transverse conveyors 64 of object receiving assembly 16 is accomplished by the action of live rollers 48 of receiving and discharging wings 40a–d and live rollers 76 of acquisition conveyors 72 of transverse conveyors 64. To perform both loading and unloading of sortable objects 20, live rollers 48 of conveyor 44a–d of receiving and discharging wings 40a–d are reversible. Once sortable object 20 is transferred to transverse conveyor 64, the impetus for moving sortable object 20 along transverse conveyors 64 is provided by lagged live rollers 76 of transverse conveyor 64. The vertical position of receiving and discharging wing 40a–d along upright drive shaft 36 is then matched to the vertical level of induction conveyor 28 of object source conveyor 8 for receiving and sorting of another sortable object 20.

All four receiving and discharging wings 40a–d of rotating distribution assembly 12 may operate simultaneously and independently of each other. For example, assume a sequence of five sortable objects 20a–e (not shown) on source conveyor 8, such that first sortable object 20a is to be placed on first transverse conveyor 64 of middle level 68b of object receiving assembly 16; second sortable object 20b, on last transverse conveyor 64 of top level 68c; third sortable object 20c, on second transverse conveyor 64 of top level 68c; fourth sortable object 20d, on last transverse conveyor 64 of bottom level 68a; and fifth sortable object 20e, on first transverse conveyor 64 of bottom level 68a.

All five sortable objects 20a–e proceed along feed conveyor 24 toward induction conveyor 28. First sortable object 20a is transferred from feed conveyor 24 to induction conveyor 28. As receiving and discharging wing 40a rotates past induction conveyor 28 with the vertical position of receiving and discharging wing 40a along upright drive shaft 36 matched to the vertical level of induction conveyor 28, sortable object 20a is transferred from induction conveyor 28 onto receiving and discharging wing 40a. When transfer of sortable object 20a from induction conveyor 28 onto receiving and discharging wing 40a is complete, the vertical position of receiving and discharging wing 40a along upright drive shaft 36 is matched to the vertical level of middle level 68b of object receiving assembly 16.

At the same time that the vertical position of receiving and discharging wing 40a is adjusted, sortable object 20b is transferred from feed conveyor 24 to induction conveyor 28 and the vertical position of receiving and discharging wing 40b is matched to the vertical level of induction conveyor 28. As receiving and discharging wing 40b rotates past induction conveyor 28, sortable object 20b is transferred from induction conveyor 28 onto receiving and discharging wing 40b. When transfer of sortable object 20b from induction conveyor 28 onto receiving and discharging wing 40b is complete, the vertical position of receiving and discharging wing 40b along upright drive shaft 36 is matched to the vertical level of top level 68c of object receiving assembly 16.

At the same time that the vertical position of receiving and discharging wing 40b is adjusted, sortable object 20c is transferred from feed conveyor 24 to induction conveyor 28 and the vertical position of receiving and discharging wing 40c is matched to the vertical level of induction conveyor 28. As receiving and discharging wing 40c rotates past induction conveyor 28, sortable object 20c is transferred from induction conveyor 28 onto receiving and discharging wing 40c.

Meanwhile, as receiving and discharging wing 40a rotates past first transverse conveyor 64 of middle level 68b of object receiving assembly 16, sortable object 20a is transferred from receiving and discharging wing 40a onto first transverse conveyor 64 of middle level 68b.

When transfer of sortable object 20a from receiving and discharging wing 40a onto first transverse conveyor 64 of middle level 68b is complete, the vertical position of receiving and discharging wing 40a is matched to the vertical level of induction conveyor 28.

When transfer of sortable object 20c from induction conveyor 28 onto receiving and discharging wing 40c is complete, the vertical position of receiving and discharging wing 40c along upright drive shaft 36 is matched to the vertical level of top level 68c of object receiving assembly 16. At the same time, sortable object 20d is transferred from feed conveyor 24 onto induction conveyor 28 and the vertical position of receiving and discharging wing 40d along upright drive shaft 36 is matched to the vertical level of induction conveyor 28. As receiving and discharging wing 40d rotates past induction conveyor 28, sortable object 20d is transferred from induction conveyor 28 onto receiving and discharging wing 40d.

Meanwhile, as receiving and discharging wing 40b rotates past last transverse conveyor 64 of top level 68c of object receiving assembly 16, sortable object 20b is transferred from receiving and discharging wing 40b onto last transverse conveyor 64 of top level 68c. When transfer of sortable object 20b from receiving and discharging wing 40b onto last transverse conveyor 64 of top level 68c is complete, the vertical position of receiving and discharging wing 40b is matched to the vertical level of induction conveyor 28.

When transfer of sortable object 20d from induction conveyor 28 onto receiving and discharging wing 40d is complete, the vertical position of receiving and discharging wing 40d along upright drive shaft 36 is matched to the vertical level of bottom level 68a of object receiving assembly 16. At the same time, sortable object 20e is transferred from feed conveyor 24 onto induction conveyor 28 and the vertical position of receiving and discharging wing 40a along upright drive shaft 36 is matched to the vertical level of induction conveyor 28. As receiving and discharging wing 40a rotates past induction conveyor 28, sortable object 20e is transferred from induction conveyor 28 onto receiving and discharging wing 40a.

Meanwhile, as receiving and discharging wing 40c rotates past second transverse conveyor 64 of top level 68c of object receiving assembly 16, sortable object 20c is transferred from receiving and discharging wing 40c onto second transverse conveyor 64 of top level 68c. When transfer of sortable object 20c from receiving and discharging wing 40c onto second transverse conveyor 64 of top level 68c is complete, the vertical position of receiving and discharging wing 40c is matched to the vertical level of induction conveyor 28.

When transfer of sortable object 20e from induction conveyor 28 onto receiving and discharging wing 40a is complete, the vertical position of receiving and discharging wing 40a along upright drive shaft 36 is matched to the vertical level of bottom level 68a of object receiving assembly 16. When receiving and discharging wing 40d rotates past last transverse conveyor 64 of bottom level 68a of object receiving assembly 16, sortable object 20d is transferred from receiving and discharging wing 40d onto last transverse conveyor 64 of bottom level 68a. When transfer of sortable object 20d from receiving and discharging wing 40d onto last transverse conveyor 64 of bottom level 68a is complete, the vertical position of receiving and discharging wing 40d is matched to the vertical level of induction conveyor 28.

Finally, when receiving and discharging wing 40a rotates past first transverse conveyor 64 of bottom level 68a of object receiving assembly 16, sortable object 20e is transferred from receiving and discharging wing 40a onto first transverse conveyor 64 of bottom level 68a. When transfer of sortable object 20e from receiving and discharging wing 40a onto first transverse conveyor 64 of bottom level 68a is complete, the vertical position of receiving and discharging wing 40a is matched to the vertical level of induction conveyor 28, thus completing the sorting of sortable objects 20a–e.

Sortable objects 20 may be sorted by automatic rotary sorter system 4 at a maximum rate of four sortable objects 20 for each rotation of rotating distribution assembly 12. If no sortable object 20 is ready for transfer from induction conveyor 28 to receiving and discharging wing 40a–d as receiving and discharging wing 40a–d of rotating distribution assembly 12 passes induction conveyor 28, then receiving and discharging wing 40a–d completes its next rotation without transferring any sortable object 20 to object receiving assembly 16. In this case, the vertical position of receiving and discharging wing 40a–d may remain at the level of induction conveyor 28 as it rotates about vertical axis of rotation 52.

In the preferred embodiment, the operations of automatic rotary sorter system 4 of the present invention are controlled by a programmable logic controller (not shown). In exercising that control over automatic rotary sorter system 4, programmable logic controller may perform the following functions. Additionally, the programmable logic controller may perform many other functions.

The programmable logic controller may accept zip code input information for each sortable object 20 on object source conveyor 8 and thereby determine the destination of sortable object 20. Additionally, it may accept object length information and object location information for each sortable object 20 on object source conveyor 8.

Feed conveyor 24 of object source conveyor 8 and live rollers 32 of induction conveyor 28 of object source conveyor 8 may be controlled by the programmable logic controller to transfer sortable objects 20 from feed conveyor 24 to induction conveyor 28. Receiving and discharging wings 40a–d of rotating distribution assembly 12 may be moved along upright drive shaft 36 of rotating distribution assembly 12 under control of the programmable logic controller. The programmable logic controller may also control the rotation of upright drive shaft 36 of rotating distribution assembly 12 and receiving and discharging wings 40a–d of rotating distribution assembly 12 about vertical axis 52.

Live rollers 32 of induction conveyor 28 of object source conveyor 8 and live rollers 48 of horizontally aligned, tapered, reversible conveyors 44a–d of receiving and discharging wings 40a–d of rotating distribution assembly 12 may be controlled by the programmable logic controller to transfer sortable objects 20 from induction conveyor 28 to receiving and discharging wings 40a–d. The programmable logic controller may select correct transverse conveyor 64 of object receiving assembly 16 for each sortable object 20. It may also control live rollers 48 of horizontally aligned, tapered, reversible conveyors 44a–d of receiving and discharging wings 40a–d of rotating distribution assembly 12 and live rollers 76 of acquisition conveyors 72 of transverse conveyors 64 of object receiving assembly 16 to transfer sortable objects 20 from receiving and discharging wings 40a–d to selected transverse conveyors 64.

In alternative embodiments (not shown) of automatic rotary sorter system 4, the impetus for moving sortable objects 20 along object source conveyor 8 and transverse conveyors 64 may be provided by conveyor belts, or any other conventional devices known in the art for such advancement. It will be understood by those skilled in the art that receiving and discharging wings 40a–d may consist of any suitable device for receiving, holding, and transferring sortable objects 20.

In other alternative embodiments or in the embodiment of automatic rotary sorter system 4, rollers 76 of acquisition conveyor 72 of transverse conveyors 64 of object receiving assembly 16 force sortable object 20 to one edge of acquisition conveyor 72. To achieve this forcing of sortable objects 20 to one edge of acquisition conveyor 72, rollers 76 of acquisition conveyor 72 may be arranged at angles within acquisition conveyor 72 such that one end of each roller 76 is further along acquisition conveyor 72 than the other end of that roller 76.

Although in the preferred embodiment, upright drive shaft 36 is aligned along and rotates about vertical axis of rotation 52, it will be understood to those skilled in the art that such alignment and rotation need not be relative to vertical axis of rotation 52. Any orientation, including alignment along and rotation about a horizontal axis, is within the scope of the present invention.

Furthermore, it will be understood that object receiving assembly 16 may consist of more than four transverse conveyors 64 for each horizontal level 68a–c or fewer than four transverse conveyors 64 for each horizontal level 68a–c. Similarly, it will be understood that object receiving assembly 16 may consist of more than three horizontal levels 68a–c or fewer than three horizontal levels 68a–c.

In addition, it will be understood that the number of transverse conveyors 64 in each horizontal level 68a–c of object receiving assembly 16 need not be identical. For example, an alternative embodiment may contain fifteen transverse conveyors 64 disposed in four horizontal levels 68a–c of four, three, five, and three transverse conveyors 64, respectively.

Figure 1A:
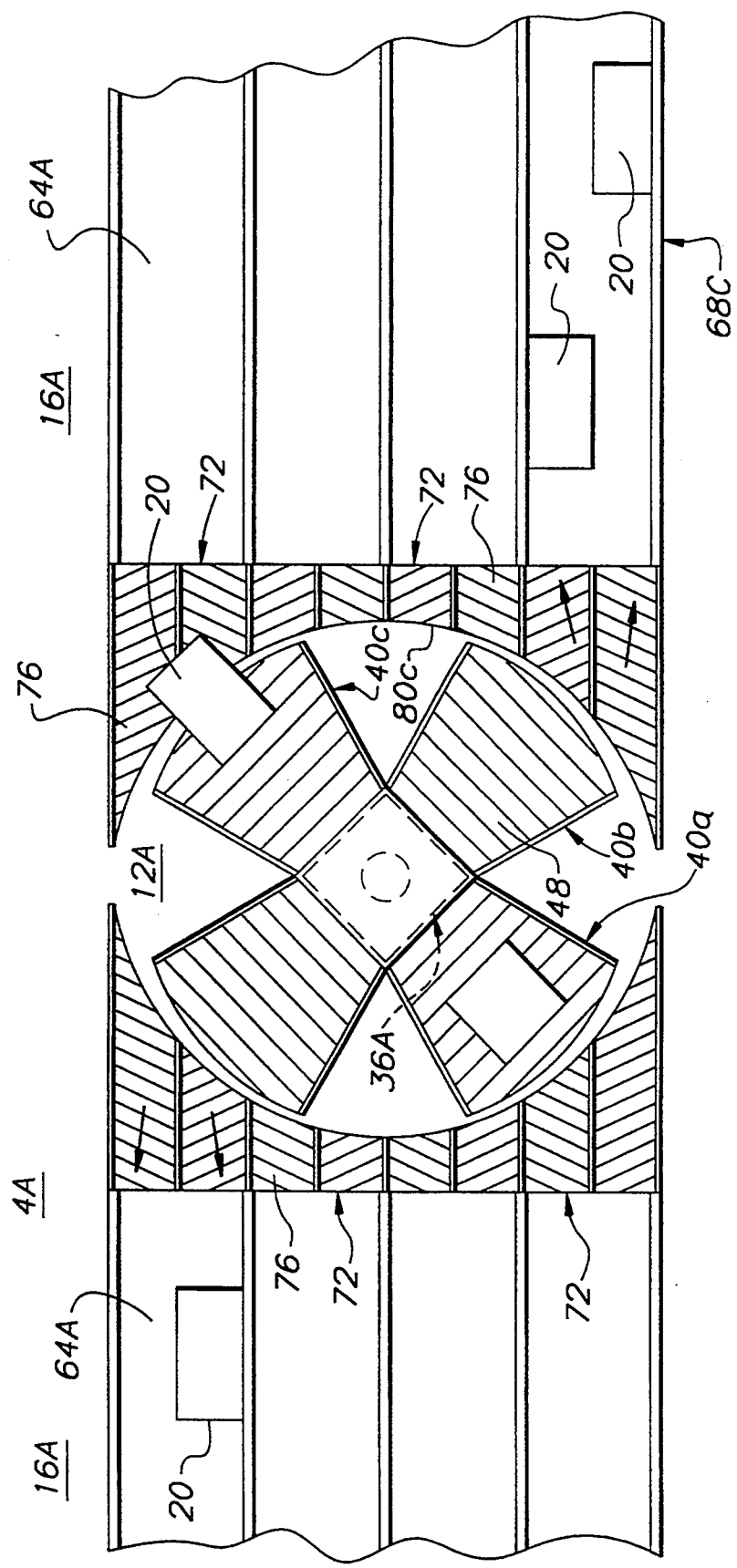
FIG. 1A is a top view of an automatic rotary sorter system according to an alternate preferred embodiment of the present invention.
Figure 2A:
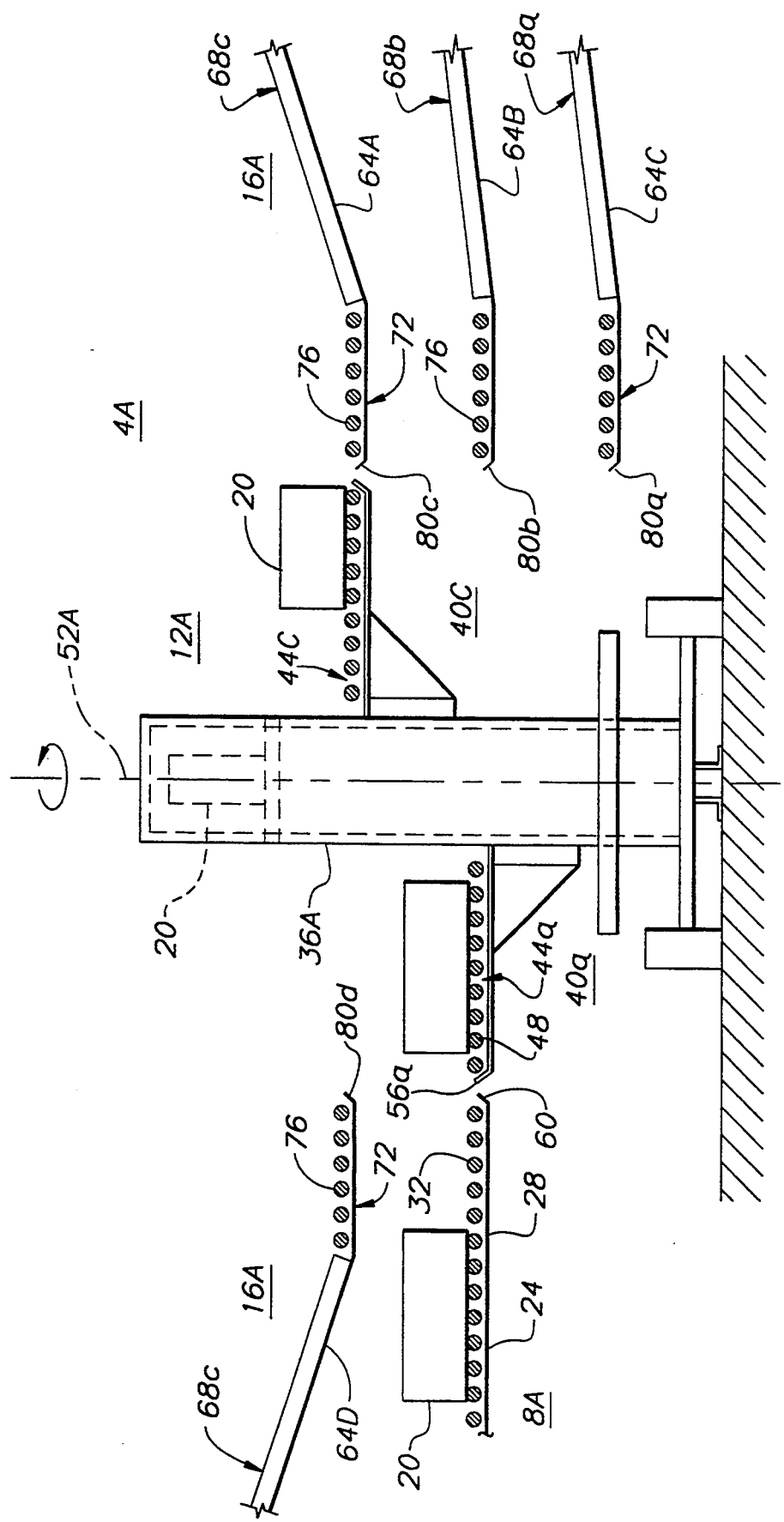
FIG. 2A is a side view of the automatic rotary sorter system of FIG. 1A.

Referring now to FIGS. 1A, 2A, there are shown, respectively, top and side views of an alternate preferred embodiment of an automatic rotary sorter system 4A of the present invention. Automatic rotary sorter system 4A includes object source conveyor 8A, rotating distribution assembly 12A, and object receiving assembly 16A. Rotating distribution assembly 12A of automatic rotary sorter system 4A is provided with upright drive shaft 36A and four receiving and discharging wings 40a–d. Object receiving assembly 16A of automatic rotary sorter system 4A is provided with a plurality of transverse conveyors 64a–d. Object source conveyor 8A provides a stream of sortable objects 20 for sorting by automatic rotary sorter system 4A. Sorting within automatic rotary sorter system 4A is achieved through the transfer of one sortable object 20 at a time from object source conveyor 8A to a selected one of transverse conveyors 64a–d by receiving and discharging wings 40a–d of rotating distribution assembly 12A. Sortable objects 20 are then advanced along selected transverse conveyors 64a–d for removal from automatic rotary sorter system 4A. Automatic rotary sorter system 4A differs from automatic rotary sorter system 4 in that rotary sorter system 4A includes a plurality of transverse conveyors 64d positioned substantially overhead object source conveyor 8A.

In automatic rotary sorter system 4A, rotating distribution assembly 12A, for transferring sortable objects 20 from object source conveyor 8A to a selected one of transverse conveyors 64a–d, consists of rotatably mounted upright drive shaft 36A to which four receiving and discharging wings 40a–d are slidably coupled. Each slidably coupled receiving and discharging wing 40a–d of rotating distribution assembly 12A is adapted to: (a) receive sortable objects 20 from object source conveyor 8A, (b) retain sortable objects 20 during rotation of rotating distribution assembly 12A, and (c) discharge sortable object 20 onto a selected transverse conveyor 64a–d of object receiving assembly 16A.

Upright drive shaft 36A of rotating distribution assembly 12A is aligned along and rotates about vertical axis of rotation 52A. As upright drive shaft 36A rotates about vertical axis of rotation 52A, receiving and discharging wings 40a–d of rotating distribution assembly 12A, coupled to upright drive shaft 36A, also rotate about vertical axis of rotation 52A. In addition to rotating about vertical axis of rotation 52A along with upright drive shaft 36A, each receiving and discharging wing 40a–d may move up and down along upright drive shaft 36A independently of all other receiving and discharging wings 40a–d. Additionally, all receiving and discharging wings 40a–d of rotating distribution assembly 12A may move up and down along upright drive shaft 36A simultaneously.

As each receiving and discharging wing 40a–d of rotating distribution assembly 12A rotates past object source conveyor 8A and transverse conveyors 64d, the vertical position of receiving and discharging wing 40a–d along upright drive shaft 36A is matched to either the vertical level of object source conveyor 8A or the vertical level of transverse conveyor 64d. When receiving and discharging wing 40a–d of rotating distribution assembly 12A passes object source conveyor 8A, at most one sortable object 20 is transferred from object source conveyor 8A to receiving an discharging wing 40a–d. Alternatively, when receiving and discharging wing 40a–d passes object source conveyor 8A, a sortable object 20 may be transferred from receiving wing 40a–d to a selected transverse conveyor 64d positioned substantially overhead source conveyor 8A.

In automatic rotary sorter system 4A, object receiving assembly 16A of automatic rotary sorter system 4A includes sixteen transverse conveyors 64a–d spaced apart in three horizontal levels 68a–c. Horizontal level 68a includes the four transverse conveyors 64c; horizontal level 68b includes the four transverse conveyors 64b; and horizontal level 68c includes the four transverse conveyors 64c as well as the four transverse conveyors 64d positioned substantially overhead conveyor 8A. Thus, each transverse conveyor 64a–d of object receiving assembly 16A is uniquely designated by (i) a vertical level of displacement along upright drive shaft 36A parallel to vertical axis of rotation 52A, and (ii) an angular orientation of upright drive shaft 36A about vertical axis of rotation 52A relative to, for example, object source conveyor 8A.

When sortable object 20 is off-loaded from receiving and discharging wing 40a–d of rotating distribution assembly 12A, the vertical position of receiving and discharging wing 40a–d along upright drive shaft 36A is matched to the vertical level of a selected transverse conveyor 64a–d of object receiving assembly 16A to which sortable object 20 is to be transferred while upright drive shaft 36A is rotating. When receiving and discharging wing 40a–d of rotating distribution assembly 12A rotates past selected transverse conveyor 64a–d, sortable object 20 on receiving and discharging wing 40a–d is transferred from receiving and discharging wing 40a–d to selected transverse conveyor 64a–d. Once sortable object 20 is transferred to a selected transverse conveyor, the vertical position of receiving and discharging wing 40a–d along upright drive shaft 36A may then be matched to the vertical level of object source conveyor 8A for receiving and sorting of another sortable object 20. All four receiving and discharging wings 40a–d of rotating distribution assembly 12A may operate simultaneously and independently of each other within automatic rotary sorting system 4A. Sorting within automatic rotary sorter system 4A is achieved through the transfer of sortable objects 20 from object source conveyor 8A to a selected transverse conveyor 64a–d by rotating distribution assembly 12A. Sortable objects 20 are then advanced along selected transverse conveyor 64a–d for removal from automatic rotary sorter system 4A.

Object source conveyor 8A of automatic rotary sorter system 4A includes feed conveyor 24 and induction conveyor 28. Sortable objects 20 are advanced along feed conveyor 24 toward induction conveyor 28, transferred one at a time onto induction conveyor 28, and then transferred one at a time onto a receiving and discharging wing 40a–d of rotating distribution assembly 12. Lagged live rollers 32 of induction conveyor 28 provide the impetus for moving sortable 20 along induction conveyor 28 and for discharging sortable object 20 onto receiving and discharging wings 40a–d. Feed conveyor 24, induction conveyor 28 and rollers 32 of sorter system 4A function substantially as described in connection with sorter system 4 and FIGS. 1, 2 above.

Each receiving and discharging wing 40a–d of rotating distribution assembly 12A is adapted to: (a) receive sortable objects 20 from object source conveyor 8A, (b) retain sortable objects 20 during rotation of rotating distribution assembly 12A, and (c) discharge sortable objects 20 onto object receiving assembly 16A. Each receiving and discharging wing 40a–d of rotating distribution assembly 12A is provided with horizontally aligned, tapered, reversible conveyor 44a–d having lagged live rollers 48. Reversible conveyor 44a–d and rollers 48 of sorter system 4A function substantially as described in connection with sorter system 4 and FIGS. 1, 2 above.

Upright drive shaft 36A is aligned along and rotates about vertical axis of rotation 52A. As upright drive shaft 36A rotates about vertical axis of rotation 52A, receiving and discharging wings 40a–d, coupled to upright drive shaft 36A, also rotate about vertical axis of rotation 52A. This rotational motion of upright drive shaft 36A and receiving and discharging wings 40a–d defines a first degree of freedom of motion of rotating distribution assembly 12A. It will also be understood that the independent and simultaneous motion of receiving and discharging wings 40a–d along upright drive shaft 36A is motion in the linear degree of freedom and defines a second degree of freedom of motion of rotating distribution assembly 12. This two-degree-of-freedom combination of linear and rotational motion allows receiving and discharging wings 40a–d to access locations distributed cylindrically over a full 360 degrees about vertical axis of rotation 52A.

As a receiving and discharging wing 40a–d of rotating distribution assembly 12A rotates past induction conveyor 28 of object source conveyor 8A, the vertical position of receiving and discharging end 56a–d of receiving and discharging wing 40a–d along upright drive shaft 36A may be matched to the vertical level of discharging end 60 of induction conveyor 28. Discharging end 60 of induction conveyor 28 is shaped to conform with the shape of receiving and discharging ends 56a–d of respective receiving and discharging wings 40a–d of rotating distribution assembly 12, to transfer sortable objects 20 from induction conveyor 28 to receiving and discharging wing 40a–d. Each transverse conveyor 64a–d of object receiving assembly 16A is provided with its individual acquisition conveyor 72. Each acquisition conveyor 72 includes a receiving end 80a–d and lagged live rollers 76 which are used for receiving sortable object 20 from receiving and discharging wings 40a–d. Acquisition conveyors 72 and rollers 76 of sorter system 4A function substantially as described in connection with sorter system 4 and FIGS. 1, 2 above.

Sortable objects 20 may be sorted by automatic rotary sorter system 4A at a maximum rate of four sortable objects 20 for each rotation of rotating distribution assembly 12A. If no sortable object 20 is ready for transfer from induction conveyor 28 to receiving and discharging wing 40a–d as receiving and discharging wing 40a–d of rotating distribution assembly 12A passes induction conveyor 28, then receiving and discharging wing 40a–d completes its next rotation without transferring any sortable object 20 to object receiving assembly 16A. In this case, the vertical position of receiving and discharging wing 40a–d may remain at the level of induction conveyor 28 as it rotates about vertical axis of rotation 52A. In addition, if sortable object 20 is transferred from receiving and discharging wing 40a–d to transverse conveyor 64d (positioned substantially overhead induction conveyor 28), then wing 40a–d may complete its next rotation in an empty state before receiving a further object 20 from induction conveyor 28.

Figure 1B:
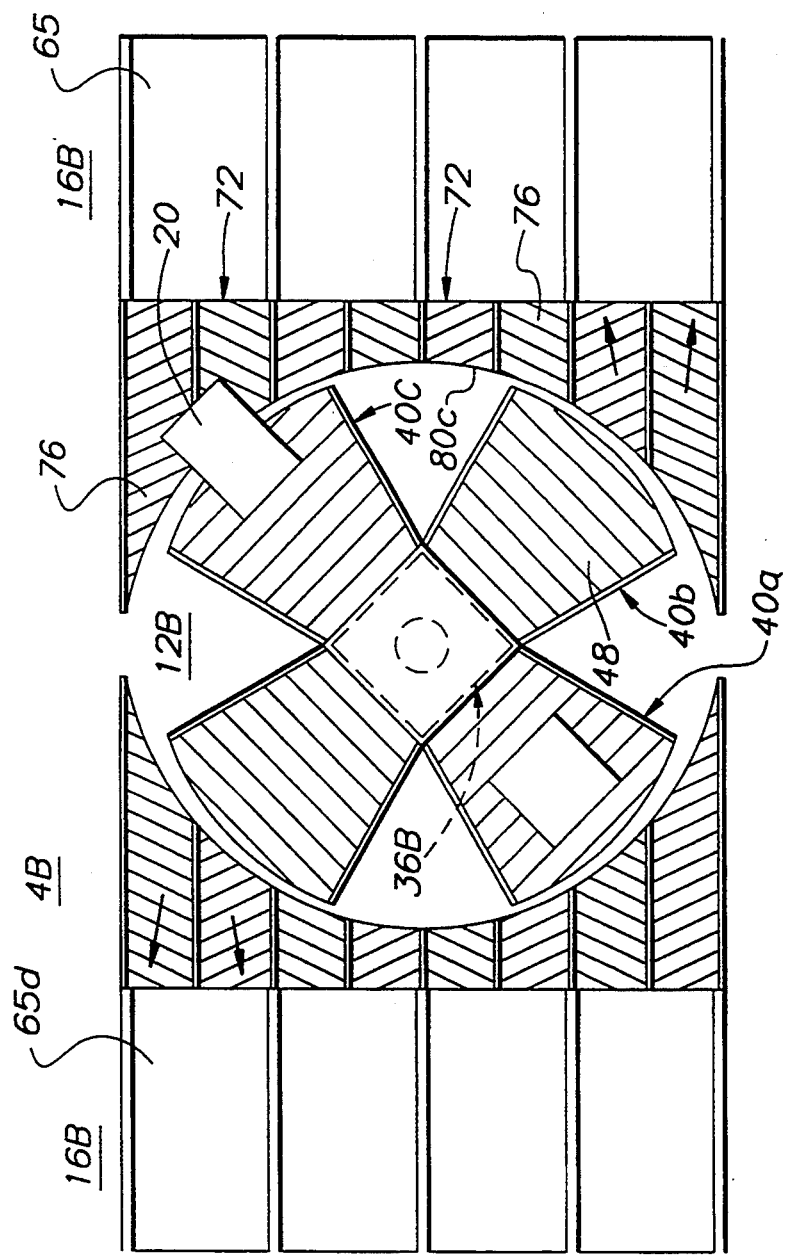
FIG. 1B is a top view of an automatic cylindrical storage system according to an alternate preferred embodiment of the present invention.
Figure 2B:
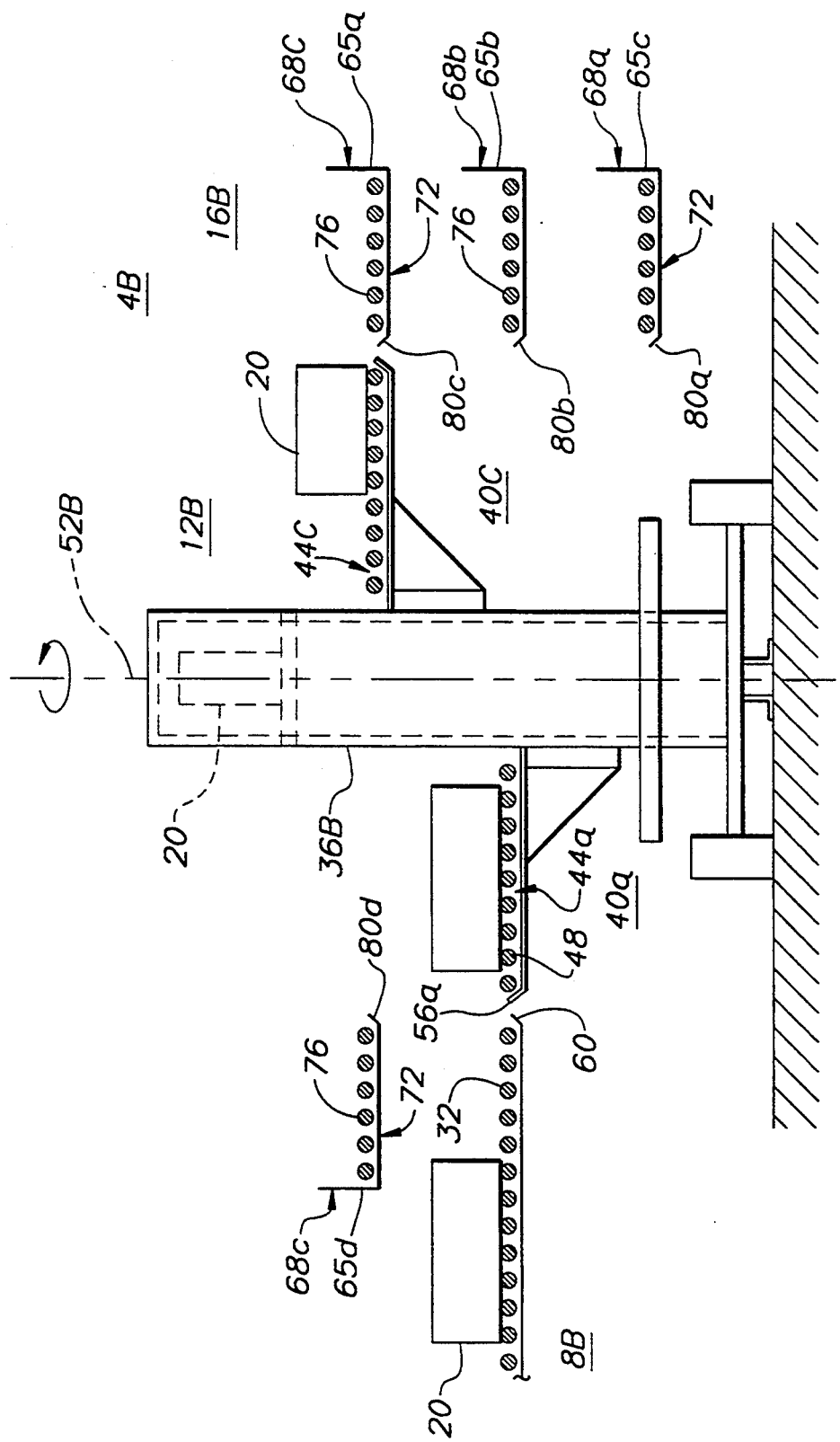
FIG. 2B is a side view of the automatic cylindrical storage system of FIG. 1B.

Referring now to FIGS. 1B, 2B, there are shown, respectively, top and side views of a preferred embodiment of an automatic cylindrical storage system 4B of the present invention. Automatic cylindrical storage system 4B includes object storage and retrieval conveyor 8B, rotating distribution assembly 12B, and object storage assembly 16B. Rotating distribution assembly 12B is provided with upright drive shaft 36B and four receiving and discharging wings 40a–d. Object receiving assembly 16B is provided with a plurality of object storage racks 65a–d. Object storage and retrieval conveyor 8B is adapted to provide a stream of sortable objects 20 to automatic cylindrical storage system 4B for storage. Object storage and retrieval conveyor 8B is reversible and, when not providing objects 20 to system 4B, may be adapted to retrieve objects 20 from cylindrical storage system 4B. Storage within cylindrical storage system 4B is achieved through the transfer of a sortable object 20 from object storage and retrieval conveyor 8B to a selected object storage rack 65a–d by receiving and discharging wings 40a–d of rotating distribution assembly 12B. Retrieval from cylindrical storage system 4B is achieved through the transfer of a sortable object 20 from a storage rack 65a–d to object storage and retrieval conveyor 8B by receiving and discharging wings 40a–d.

In the preferred embodiment of automatic cylindrical storage system 4B, rotating distribution assembly 12B, for transferring sortable objects 20 from object storage and retrieval conveyor 8B to a selected storage rack 65a–d and from a selected storage rack 65a–d to object storage and retrieval conveyor 8B, consists of rotatably mounted upright drive shaft 36B to which four receiving and discharging wings 40a–d are slidably coupled. Each slidably coupled receiving and discharging wing 40a–d of rotating distribution assembly 12B is adapted to: (a) receive sortable objects 20 from object storage and retrieval conveyor 8B, (b) retain sortable objects 20 during rotation of rotating distribution assembly 12B, (c) discharge sortable objects 20 onto a selected storage rack 65a–d of object storage assembly 16B, (d) receive sortable objects 20 from a selected storage rack 65a–d, and (e) discharge sortable objects 20 retrieved from storage racks 65a–d onto storage and retrieval conveyor 8B.

Upright drive shaft 36B of rotating distribution assembly 12B is aligned along and rotates about vertical axis of rotation 52B. As upright drive shaft 36B rotates about vertical axis of rotation 52B, receiving and discharging wings 40a–d of rotating distribution assembly 12B, coupled to upright drive shaft 36B, also rotate about vertical axis of rotation 52B. In addition to rotating about vertical axis of rotation 52B along with upright drive shaft 36B, each receiving and discharging wing 40a–d may move up and down along upright drive shaft 36B independently of all other receiving and discharging wings 40a–d. Additionally, all receiving and discharging wings 40a–d of rotating distribution assembly 12B may move up and down along upright drive shaft 36B simultaneously.

When cylindrical storage system 4B is operating in its storage mode such that object storage and retrieval conveyor 8B has been activated in a forward direction to carry sortable objects 20 for storage to cylindrical storage system 4B, the vertical position of each receiving and discharging wing 40a–d along upright drive shaft 36B may be matched to the vertical level of either object storage and retrieval conveyor 8B or storage rack 65d as receiving and discharging wing 40a–d rotates past object storage and retrieval conveyor 8B. In this storage mode, when receiving and discharging wing 40a–d of rotating distribution assembly 12B rotates past object storage and retrieval conveyor 8B, a sortable object 20 may be transferred from object storage and retrieval conveyor 8B to receiving and discharging wing 40a–d provided the vertical level of receiving and discharging wing 40a–d has been matched to the vertical level of storage and retrieval conveyor 8B. Alternatively, when storage system 4B is operating in its storage mode, a sortable object 20 may be transferred from receiving and discharging wing 40a–d to a selected storage rack 65d positioned substantially overhead object conveyor 8B as receiving and discharging wing 40a–d passes object conveyor 8B provided the vertical level of receiving and discharging wing 40a–d has been matched to the vertical level of storage rack 65d.

Similarly, when storage system 4B is operating in its retrieval mode, such that object storage and retrieval conveyor 8B has been activated in a reverse direction to carry sortable objects 20 from cylindrical storage system 4B, the vertical position of each receiving and discharging wing 40a–d may be matched to the vertical level of either object storage and retrieval conveyor 8B or storage rack 65d as each receiving and discharging wing 40a–d rotates past object conveyor 8B. In this retrieval mode, when receiving and discharging wing 40a–d of assembly 12B passes object storage and retrieval conveyor 8B, a sortable object 20 may be transferred from receiving and discharging wing 40a–d to object storage and retrieval conveyor 8B provided the vertical level of receiving and discharging wing 40a–d has been matched to the vertical level of storage and retrieval conveyor 8B. Alternatively, when storage system 4B is operating in its retrieval mode, a sortable object 20 may be transferred from a selected storage rack 65d positioned substantially overhead object storage and retrieval conveyor 8B to receiving and discharging wing 40a–d as receiving and discharging wing 40a–d passes object conveyor 8B provided the vertical level of receiving and discharging wing 40a–d has been matched to the vertical level of storage rack 65d.

In the preferred embodiment of automatic cylindrical storage system 4B, object receiving assembly 16B includes sixteen object storage racks 65a–d spaced apart in three horizontal levels 68a–c. Horizontal level 68a includes the four storage racks 65c; horizontal level 68b includes the four storage racks 65b; and horizontal level 68c includes the four storage racks 65a as well as the four storage racks 65d positioned substantially overhead object conveyor 8B. Thus, each object storage rack 65a–d is uniquely designated by (i) a vertical level of displacement along upright drive shaft 36B parallel to vertical axis of rotation 52B, and (ii) an angular orientation of upright drive shaft 36B about vertical axis of rotation 52B relative to, for example, object storage and retrieval conveyor 8B.

When sortable object 20 is off-loaded from receiving and discharging wing 40a–d of rotating distribution assembly 12B in the storage mode of system 4B, the vertical position of receiving and discharging wing 40a–d along upright drive shaft 36B is matched to the vertical level of a selected storage rack 65a–d to which sortable object 20 is to be transferred for storage while upright drive shaft 36B is rotating. In the storage mode, when receiving and discharging wing 40a–d of rotating distribution assembly 12B rotates past selected storage rack 65a–d, sortable object 20 on receiving and discharging wing 40a–d is transferred from receiving and discharging wing 40a–d to selected storage rack 65a–d. In the storage mode, once sortable object 20 is transferred to selected storage rack 65a–d, the vertical position of receiving and discharging wing 40a–d along upright drive shaft 36B may then be matched to the vertical level of object storage and retrieval conveyor 8B for receiving another sortable object 20 for storage.

When sortable object 20 is on-loaded onto receiving and discharging wing 40a–d in the retrieval mode of system 4B, the vertical position of receiving and discharging wing 40a–d along upright shaft 36B is matched to the vertical level of a selected storage rack 65a–d from which sortable object 20 is to be retrieved while upright drive shaft 36B is rotating. In the retrieval mode, when receiving and discharging wing 40a–d of assembly 12B rotates past selected storage rack 65a–d, sortable object 20 in selected storage rack 65a–d is transferred from selected storage rack 65a–d to receiving and discharging wing 40a–d. In the retrieval mode, once sortable object 20 is transferred from storage rack 65a–d to receiving and discharging wing 40a–d, the vertical position of receiving and discharging wing 40a–d along upright drive shaft 36b may then be matched to the vertical level of object storage and retrieval conveyor 8B for discharging retrieved object 20 onto storage and retrieval conveyor 8B.

All four receiving and discharging wings 40a-d of rotating distribution assembly 12B may operate simultaneously and independently of each other within automatic cylindrical storage system 4B. Storage within automatic cylindrical storage system 4B is thus achieved through the transfer of sortable objects 20 from object storage and retrieval conveyor 8B to selected storage rack 65a-d by rotating distribution assembly 12B. Retrieval within automatic cylindrical storage system 4B is similarly achieved through the transfer of sortable objects 20 from selected storage rack 65a-d to object storage and retrieval conveyor 8B by rotating distribution assembly 12B. Lagged live rollers 32 of object storage and retrieval conveyor 8B provide the impetus for moving object 20 along storage and retrieval conveyor 8B and for discharging and receiving sortable object 20 onto and from receiving and discharging wings 40a-d.

Each receiving and discharging wing 40a-d of rotating distribution assembly 12B is adapted to: (a) receive sortable objects 20 from object storage and retrieval conveyor 8B or selected storage rack 65a-d, (b) retain sortable objects 20 during rotation of rotating distribution assembly 12B, and (c) discharge sortable objects 20 onto selected storage rack 65a-d or object storage and retrieval conveyor 8B. Each receiving and discharging wing 40a-d of rotating distribution assembly 12B is provided with horizontally aligned, tapered, reversible conveyor 44a-d having lagged live rollers 48. Reversible conveyor and rollers 48 of system 4B function substantially as described in connection with sorter system 4 and FIGS. 1, 2 above.

Upright drive shaft 36B is aligned along and rotates about vertical axis of rotation 52B. As upright drive shaft 36B rotates about vertical axis of rotation 52B, receiving and discharging wings 40a-d, coupled to upright drive shaft 36B, also rotate about vertical axis of rotation 52B. This rotational motion of upright drive shaft 36B and receiving and discharging wings 40a-d defines a first degree of freedom of motion of rotating distribution assembly 12B. It will also be understood that the independent and simultaneous motion of receiving and discharging wings 40a-d along upright drive shaft 36B is motion in the linear degree of freedom and defines a second degree of freedom of motion of rotating distribution assembly 12B. This two-degree-of-freedom combination of linear and rotational motion allows receiving and discharging wings 40a-d of assembly 12B to access locations distributed cylindrically over a full 360 degrees about vertical axis of rotation 52B.

As a receiving and discharging wing 40a-d of rotating distribution assembly 12B rotates past object storage and retrieval conveyor 8B, the vertical position of receiving and discharging end 56a-d of receiving and discharging wing 40a-d along upright drive shaft 36B may be matched to the vertical level of discharging end 60 of object storage and retrieval conveyor 8B. Discharging end 60 of object storage and retrieval conveyor 8B is shaped to conform with the shape of receiving and discharging ends 56a-d of respective receiving and discharging wings 40a-d of rotating distribution assembly 12B, to transfer sortable objects 20 from object storage and retrieval conveyor 8B to receiving and discharging wing 40a-d and from receiving and discharging wing 40a-d to object storage and retrieval conveyor 8B.

Each storage rack 65a-d of assembly 16B is provided with its individual storage conveyor 72. Each storage conveyor 72 includes a receiving end 80a-d and lagged live rollers 76. Lagged live rollers 76 are used for receiving object 20 from and discharging sortable object 20 onto receiving and discharging wings 40a-d.

It will be understood that assembly 16B may consist of more than four (or more than eight) storage racks 65 for each horizontal level 68a-c or fewer than four storage racks 65 for each horizontal level 68a-c. Similarly, it will be understood that assembly 16B may consist of more than three horizontal levels 68a-c of storage racks 65. Furthermore, it will be understood that the number of storage racks 65 in each horizontal level 68a-c of assembly 16B need not be identical.

Figure 3:
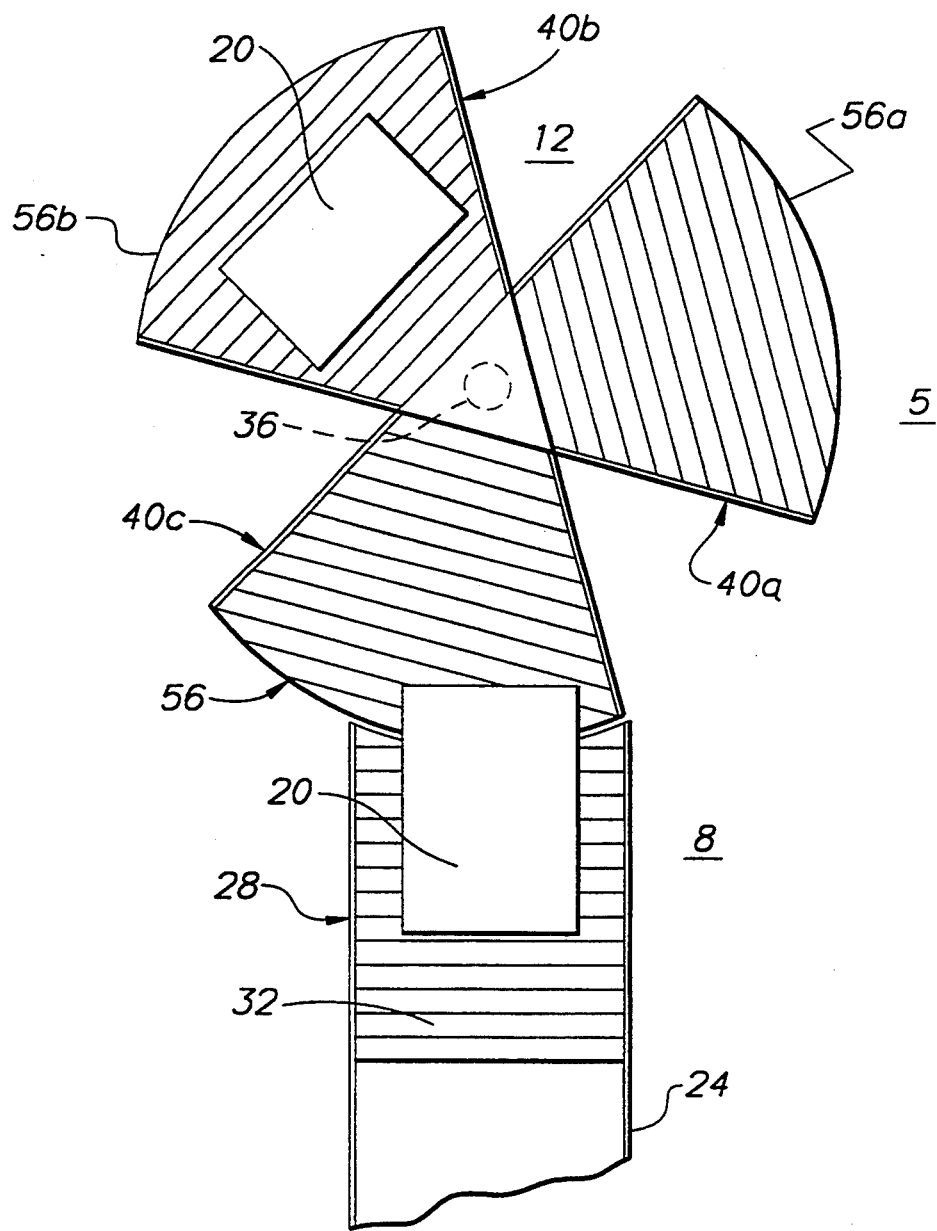
FIG. 3 is a plan view of an alternative embodiment of the automatic rotary sorter system of the present invention.

Referring now to FIG. 3, there is shown a plan view of automatic rotary sorter system 5. Automatic rotary sorter system 5 is an alternative embodiment of automatic rotary sorter system 4 of the present invention. Rotary distribution assembly 12 of automatic sorter system 5 is provided with upright drive shaft 36 and three receiving and discharging wings 40a-c. The use of three receiving and discharging wings 40a-c instead of four provides for increased dwell time and the ability to sort larger objects. It will also be understood by those skilled in the art that rotating distribution assembly 12 may consist of more than four receiving and discharging wings 40a-d or fewer than three receiving and discharging wings 40a-d.

It will further be understood that various changes in the details, materials, and arrangements of the parts which have been described and illustrated in order to explain the nature of this invention may be made by those skilled in the art without departing from the principle and scope of the invention as expressed in the following claims.

I claim:

1. A system for sorting a plurality of objects having object source means for providing said objects for sorting and a plurality of object receiving means for receiving said objects after sorting, wherein the individual object receiving means of said plurality of object receiving means are spaced apart both horizontally and vertically, comprising:

a plurality of object receiving and discharging means for receiving said objects from said object source means and transferring said objects to said object receiving means; and, each of said object receiving and discharging means having means for moving an object of said plurality of objects both horizontally and vertically from the vicinity of said object source means to the vicinity of a selected one of said horizontally and vertically spaced apart object receiving means to transfer said object to said selected object receiving means;

wherein said object source means and at least one of said object receiving means are vertically aligned, each of said object receiving and discharging means is coupled to a rotatable member which rotates about an axis of rotation, and said rotatable member rotates about said axis of rotation continuously.

2. The system in accordance with claim 1, wherein said object source means comprises object transferring means for transferring said object from said object source means to said object receiving and discharging means.

3. The system in accordance with claim 2, wherein said object transferring means comprises an induction conveyor.

4. The system in accordance with claim 3, wherein said induction conveyor comprises a live roller.

5. The system in accordance with claim 4, wherein said live roller is lagged.

6. The system in accordance with claim 4, wherein said induction conveyor has a forward direction and said live roller is aligned at an angle with respect to said forward direction to urge said object toward a side of said induction conveyor.

7. The system in accordance with claim 4, wherein said induction conveyor is tapered.

8. The system in accordance with claim 3, wherein said induction conveyor is tapered.

9. The system in accordance with claim 8, wherein each object receiving and discharging means of said plurality of object receiving and discharging means is adapted to move along said rotatable member in positive and negative directions substantially parallel to said axis of rotation.

10. The system in accordance with claim 9, wherein each object receiving and discharging means of said plurality of object receiving and discharging means moves along said rotatable member in positive and negative directions independently of each remaining object receiving and discharging means of said plurality of object receiving and discharging means.

11. The system in accordance with claim 9, wherein each object receiving and discharging means of said plurality of object receiving and discharging means moves along said rotatable member in positive and negative directions simultaneously with each remaining object receiving and discharging means of said plurality of object receiving and discharging means.

12. The system in accordance with claim 1, wherein said object source means comprises:
a feed conveyor for providing said object for sorting; and,
an induction conveyor for receiving said object from said feed conveyor and providing said object to said object receiving and discharging means.

13. The system in accordance with claim 1, wherein the shape of said object source means conforms with the shape of said object receiving and discharging means.

14. The system in accordance with claim 1, wherein said rotatable member rotates about said axis of rotation at a constant rate.

15. The system in accordance with claim 1, wherein said axis of rotation is aligned substantially vertically.

16. The system in accordance with claim 1, wherein said object receiving and discharging means is tapered.

17. The system in accordance with claim 1, wherein said object receiving and discharging means comprises a conveyor assembly.

18. The system in accordance with claim 17, wherein said conveyor assembly is reversible.

19. The system in accordance with claim 17, wherein said conveyor assembly comprises a live roller.

20. The system in accordance with claim 19, wherein said live roller is lagged.

21. The system in accordance with claim 19, wherein said conveyor assembly has a forward direction and said live roller is aligned at an angle with respect to said forward direction to urge said object toward a side of said conveyor assembly.

22. The system in accordance with claim 17, wherein said conveyor assembly is tapered.

23. The system in accordance with claim 1, wherein four of said object receiving and discharging means are provided.

24. The system in accordance with claim 1, wherein the shape of each of said object receiving and discharging means conforms to the shape of said horizontally and vertically spaced apart object receiving means.

25. The system in accordance with claim 1, wherein each of said horizontally and vertically spaced apart object receiving means comprises means for receiving said object from said object receiving and discharging means.

26. The system in accordance with claim 25, wherein each of said means for receiving said object from said object receiving and discharging means is a transverse conveyor.

27. The system in accordance with claim 26, wherein said receiving means comprises a live roller.

28. The system in accordance with claim 27, wherein said live roller is lagged.

29. The system in accordance with claim 27, wherein said receiving means is tapered.

30. The system in accordance with claim 1, comprising sixteen of said horizontally and vertically spaced apart object receiving means arranged in three spaced apart substantially horizontal rows, each of said horizontal rows having at least four of said horizontally spaced apart object receiving means.

31. A method for sorting an object of a plurality of objects in a system having object source means for providing said object for sorting and a plurality of object receiving means for receiving said object after sorting, wherein the object receiving means of said plurality of object receiving means are spaced apart both horizontally and vertically, comprising the steps of:
(a) providing said object for sorting by said object source means;
(b) transferring said object from said object source means to object distribution means;
(c) simultaneously moving said object horizontally and vertically by said object distribution means from said object source means to a selected one of said plurality of object receiving means; and,
(d) transferring said object from said object distribution means to said selected object receiving means; wherein said object source means and at least one of said object receiving means are vertically aligned, wherein:
said movement of said object by said object distribution means comprises rotating movement applied to said object by rotation of said object distribution means about an axis of rotation; and
said rotation of said object distribution means about said axis of rotation is continuous.

32. The method in accordance with claim 31, wherein said rotation of said object distribution means about said axis of rotation is at a constant rate.

33. The method in accordance with claim 31, wherein said vertical movement of said object by said object distribution means comprises motion of said object distribution means in the positive and negative vertical directions.

34. The method in accordance with claim 31, wherein said horizontal and vertical movement of said object by said object distribution means comprises both horizontal rotation of said object distribution means about an axis of rotation and vertical motion of said object distribution means substantially parallel to said axis of rotation.

35. The method in accordance with claim 34, wherein said object distribution means comprises a plurality of receiving and discharging means having means for moving vertically along said axis of rotation independently of each other substantially parallel to said axis of rotation.

36. The method in accordance with claim 35, wherein said vertical movements of individual receiving and discharging means of said plurality of receiving and discharging means occur simultaneously with each other.

37. The method in accordance with claim 34, wherein said objects are sorted at a maximum rate in accordance with a predetermined number of receiving and discharging means forming said object distribution means.

38. A system for sorting an object of a plurality of objects having object source means for providing said object for sorting and a plurality of object receiving means for receiving said object after sorting, wherein the individual object receiving means of said plurality of object receiving means are spaced apart both horizontally and vertically, comprising:
   object receiving and discharging means for receiving said object from said object source means and transferring said object to said object receiving means; and
   said object receiving and discharging means having means for moving said object both horizontally and vertically from the vicinity of said object source means to the vicinity of a selected one of said horizontally and vertically spaced apart object receiving means to transfer said object to said selected object receiving means, wherein
      a first end of said object receiving and discharging means is coupled to a rotatable member which rotates continuously about an axis of rotation;
      said object receiving and discharging means is tapered wherein said first end of said object receiving and discharging means is narrower than a second end of said object receiving and discharging means; and
      said second end of said object receiving and discharging means is alternately positioned adjacent to said object source means and said object receiving means during said continuous rotation of said rotatable member.

39. The system in accordance with claim 38, wherein the shape of said object source means conforms with the shape of said object receiving and discharging means.

40. The system in accordance with claim 38, comprising a plurality of said object receiving and discharging means, wherein each of said object receiving and discharging means is coupled to said rotatable member.

41. The system in accordance with claim 38, wherein said rotatable member rotates about said axis of rotation at a constant rate.

42. The system in accordance with claim 38, wherein the shape of said object receiving and discharging means conforms to the shape of said horizontally and vertically spaced apart object receiving means.

43. A method for sorting an object of a plurality of objects in a system having object source means for providing said object for sorting and a plurality of object receiving means for receiving said object after sorting, wherein the object receiving means of said plurality of object receiving means are spaced apart both horizontally and vertically, comprising the steps of:
   (a) providing said object for sorting by said object source means;
   (b) transferring said object from said object source means to object distribution means;
   (c) horizontally and vertically moving said object by said object distribution means from said object source means to a selected one of said plurality of object receiving means; and,
   (d) transferring said object from said object distribution means to said selected object receiving means; wherein said object source means and at least one of said object receiving means are vertically aligned, wherein
      said movement of said object by said object distribution means comprises rotating movement applied to said object by rotation of said object distribution means about an axis of rotation, and
      said rotation of said object distribution means about said axis of rotation is continuous.

44. The method in accordance with claim 43, wherein said rotation of said object distribution means about said axis of rotation is at a constant rate.

45. The method in accordance with claim 43, wherein said object distribution means comprises a plurality of receiving and discharging means having means for moving vertically along said axis of rotation independently of each other substantially parallel to said axis of rotation.

46. The method in accordance with claim 45, wherein said vertical movements of individual receiving and discharging means of said plurality of receiving and discharging means occur simultaneously with each other.

47. A system for storing and retrieving an object of a plurality of objects having object storage and retrieval conveyor means for providing said object to said system for storage and for retrieving said object from said system after storage, and a plurality of object storage means for receiving said object for storage and discharging said object after storage, wherein the individual object storage means of said plurality of object storage means are spaced apart both horizontally and vertically, comprising:
   object receiving and discharging means for receiving said object from said object storage and retrieval conveyor means and transferring said object to said object storage means and for receiving said object from said object storage means and transferring said object to said object storage and retrieval conveyor means; and
   said object receiving and discharging means having means for moving said object both horizontally and vertically from the vicinity of said object storage and retrieval conveyor means to the vicinity of a selected one of said horizontally and vertically spaced apart object storage means to transfer said object from said object storage and retrieval conveyor means to said selected object storage means for storage; and
   said object receiving and discharging means having means for moving said object both horizontally and vertically from the vicinity of said selected object storage means to the vicinity of said object storage and retrieval conveyor means to transfer said object from said selected object storage means to said object storage and retrieval conveyor means for retrieval, wherein a first end of said object receiving and discharging means is coupled to a rotatable member which rotates continuously about an axis of rotation;

said object receiving and discharging means is tapered wherein said first end of said object receiving and discharging means is narrower than a second end of said object receiving and discharging means; and said second end of said object receiving and discharging means is alternately positioned adjacent to said object storage and retrieval conveyor means and said object storage means during said continuous rotation of said rotatable member.

48. The system in accordance with claim 47, wherein the shape of said object storage and retrieval conveyor means conforms with the shape of said object receiving and discharging means.

49. The system in accordance with claim 47, comprising a plurality of said object receiving and discharging means, wherein each of said object receiving and discharging means is coupled to said rotatable member.

50. The system in accordance with claim 49, wherein each object receiving and discharging means of said plurality of object receiving and discharging means is adapted to move along said rotatable member in positive and negative directions substantially parallel to said axis of rotation and independently of each remaining object receiving and discharging means of said plurality of object receiving and discharging means.

51. The system in accordance with claim 47, wherein the shape of said object receiving and discharging means conforms to the shape of said horizontally and vertically spaced apart object storage means.

52. A method for storing and retrieving an object of a plurality of objects in a system having object conveyor means for providing said object to said system for storage and object conveyor means for retrieving said object from said system after storage, and a plurality of object storage means for receiving said object for storage and discharging said object after storage, wherein the object storage means of said plurality of object storage means are spaced apart both horizontally and vertically, comprising the steps of:

(a) providing said object for storage by said object conveyor means for providing said object;

(b) transferring said object from said object conveyor means for providing said object to object distribution means;

(c) horizontally and vertically moving said object by said object distribution means from said object conveyor means for providing said object to a selected one of said plurality of object storage means;

(d) transferring said object from said object distribution means to said selected object storage means;

(e) transferring said object from said selected object storage means to said object distribution means;

(f) horizontally and vertically moving said object by said object distribution means from said selected object storage means to said object conveyor means for retrieving said object; and (g) transferring said object from said object distribution means to said object conveyor means for retrieving said object, wherein said movement of said object by said object distribution means comprises rotating movement applied to said object by rotation of said object distribution means about an axis of rotation, and said rotation of said object distribution means about said axis of rotation is continuous.

53. The method in accordance with claim 52, wherein said object distribution means comprises a plurality of receiving and discharging means having means for moving vertically along said axis of rotation independently of each other substantially parallel to said axis of rotation.

54. The method in accordance with claim 53, wherein said vertical movements of individual receiving and discharging means of said plurality of said receiving and discharging means occur simultaneously with each other.

* * * * *